W. B. LASKEY.
CANDY MAKING MACHINE.
APPLICATION FILED APR. 18, 1917.

1,264,533.

Patented Apr. 30, 1918.
3 SHEETS—SHEET 1.

Inventor:
William B. Laskey
by Macleod, Calver, Copeland & Sime
Attys

W. B. LASKEY.
CANDY MAKING MACHINE.
APPLICATION FILED APR. 18, 1917.
1,264,533.
Patented Apr. 30, 1918.
3 SHEETS—SHEET 2.
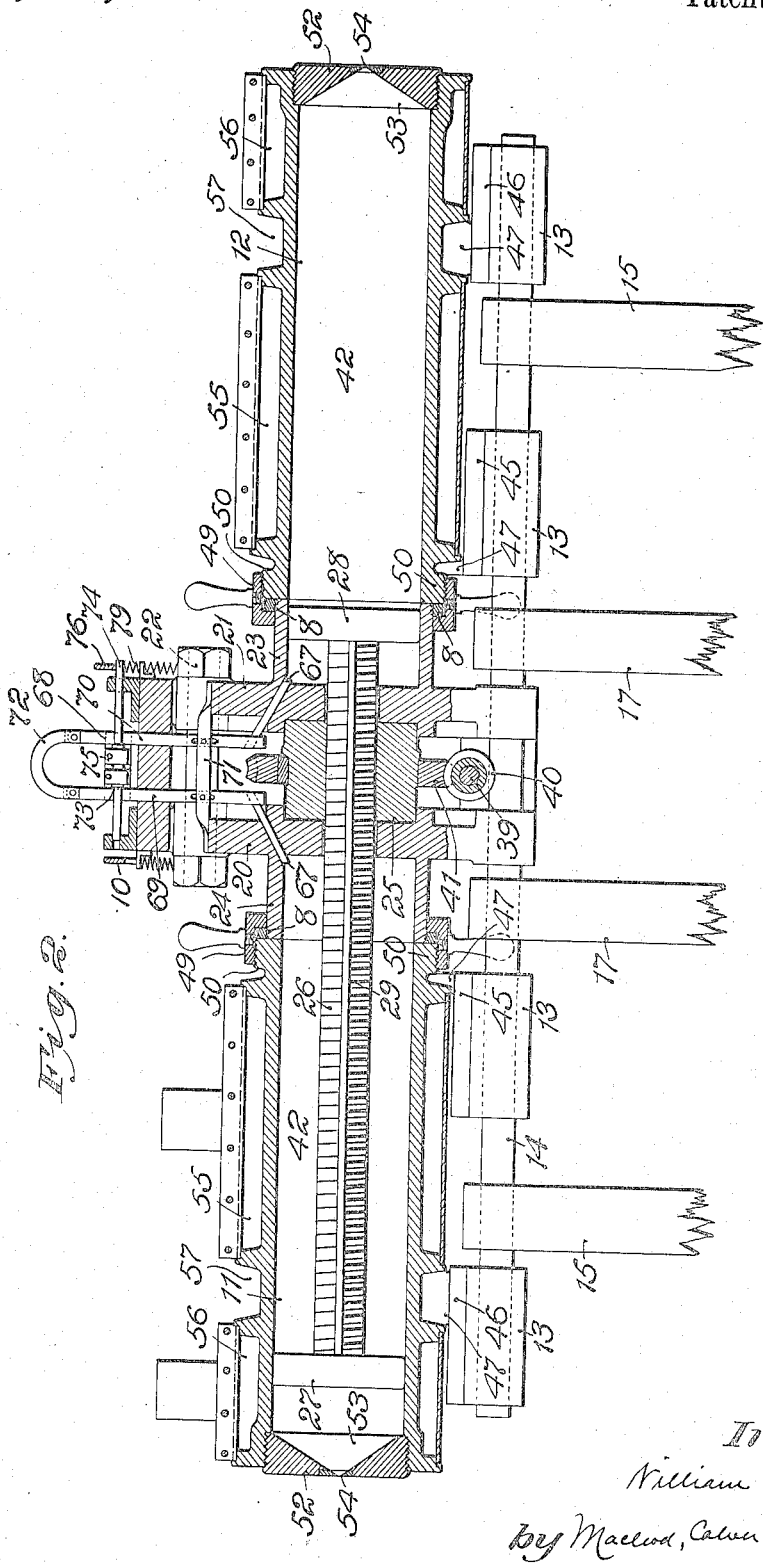

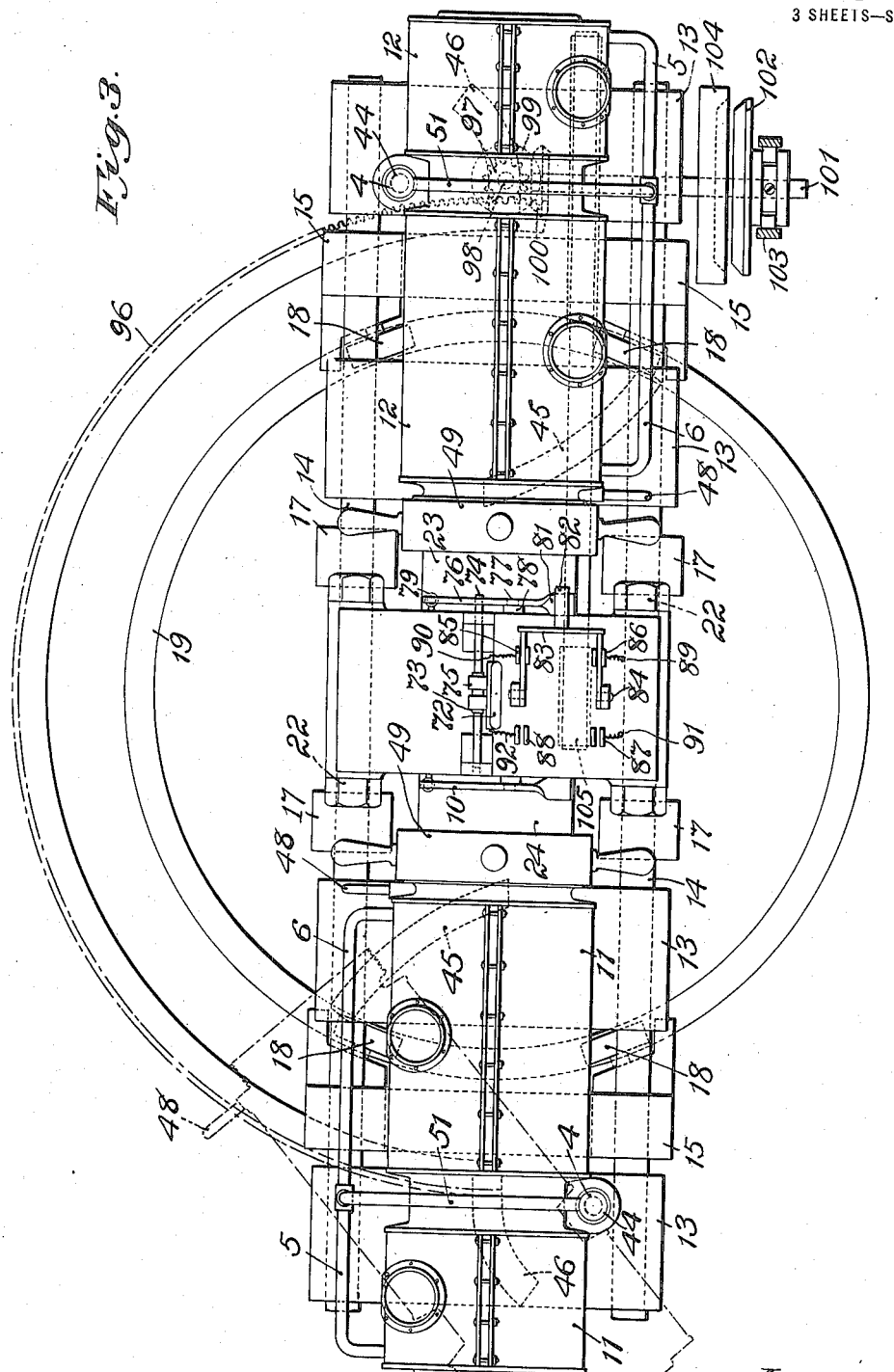

UNITED STATES PATENT OFFICE.

WILLIAM B. LASKEY, OF MARBLEHEAD, MASSACHUSETTS.

CANDY-MAKING MACHINE.

1,264,533.  Specification of Letters Patent.  Patented Apr. 30, 1918.

Application filed April 18, 1917. Serial No. 162,897.

*To all whom it may concern:*

Be it known that I, WILLIAM B. LASKEY, a citizen of the United States, residing at Marblehead, county of Essex, State of Massachusetts, have invented a certain new and useful Improvement in Candy-Making Machines, of which the following is a specification, reference being had therein to the accompanying drawings.

My invention relates to machines for making candy by forcing it through a suitable die or nozzle when in plastic condition and particularly after having been pulled by hand or on a pulling machine, and has for its object a new and improved machine for this purpose. Machines to which my invention relates comprise one or more cylinders, a piston, and mechanism for forcing the piston into the cylinder and thereby forcing the candy out of the cylinder through a die of suitable shape. In practice, it has been found that one of the chief objections to this type of machine is that the piston must be withdrawn from the cylinder after the candy in the cylinder has been completely expressed through the die before a new batch of candy can be put through the machine. Owing to the extreme stickiness and tenacity of the plastic candy, which adheres to the cylinder walls, much power is needed to withdraw the piston from the cylinder so that in practice it has been found essential to withdraw the piston relatively slowly. During this operation the machine is non-productive and a great deal of time is wasted.

The object of my invention is to produce a simple and inexpensive machine, which may be operated under a minimum of power on successive batches of candy without any intervening delay, and thereby to greatly increase the efficiency of these devices.

The machine embodying my invention comprises a pair of opposed cylinders, and a pair of pistons, one for each of the cylinders, said pistons being connected by a piston rod. It further comprises mechanism for driving the piston rod lengthwise of the cylinders so that as one batch of candy is being operated on in one cylinder by one of the pistons, the other piston is being withdrawn from the other cylinder. Each cylinder is movably mounted to enable it to be readily filled with another batch of candy after the piston has been withdrawn and before the candy in the other cylinder has been completely expressed through the die. Mechanism is also provided for automatically stopping the driving mechanism as the pistons arrive at the end of their stroke, together with means for moving the cylinders to bring the one first filled into operative position with respect to a suitable conveyer, cutter or the like.

This construction enables the use of a single conveyer by which candy is taken from each of the cylinders alternately and subjected to a cooling process in a manner well known to those skilled in the art. This feature is important for a conveyer takes up a relatively large amount of floor space and by this construction a single conveyer may be employed, and be constantly kept supplied with candy.

My invention will be fully understood from the following description taken in connection with the accompanying drawings and the novel features thereof will be pointed out and clearly defined in the claims at the end of this specification.

In the drawings, Figure 1 is a side elevation of a machine embodying my invention showing also a conveyer and cutter by which candy is being taken from the machine.

Fig. 2 is a vertical longitudinal section on a larger scale of the cylinders and connected parts of a machine embodying my invention.

Fig. 3 is a plan view on the same scale as Fig. 2 of a machine embodying my invention.

Figure 1:
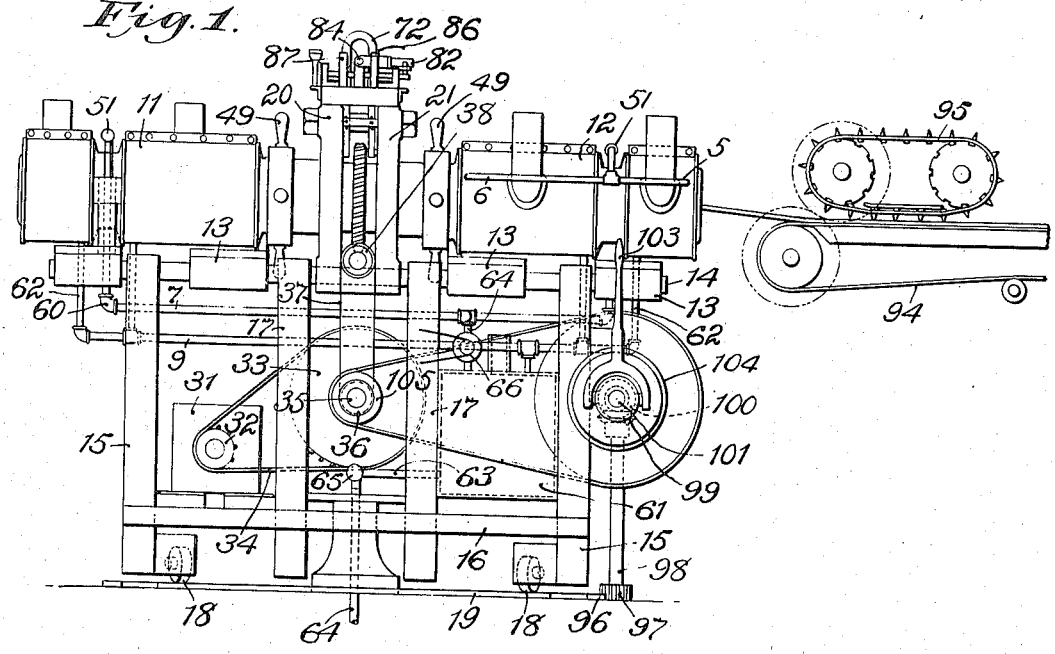

Having reference to the drawings, the machine comprises a pair of cylinders 11 and 12 provided with suitable dies 52, hereafter to be described, supported on brackets 13 mounted on horizontal rods 14. The rods 14 are supported by four legs 15 which are braced by cross ties 16 and upright braces 17 the whole forming a suitable frame for supporting the machine. Each of the legs 15 is provided with rollers 18 adapted to run on a circular track 19 (see Fig. 3) so that the entire machine may be revolved in a manner hereinafter to be described.

Between the cylinders 11 and 12 are a pair of plates 20 and 21 which are preferably of substantially rectangular shape and are spaced apart as shown, being arranged transversely of the machine. The plates 20 and 21 are secured together at their four corners by suitable bolts 22 and are each provided at their opposite sides with laterally extending tubular flanges 23 and 24 respectively, which are of the same diameter as the cylinders 11 and 12, and are arranged to aline with them in a manner to be described.

A piston rod 26 is loosely mounted in holes in the plates 20 and 21 and extends lengthwise of the cylinders 11 and 12. Pistons 27 and 28 are secured at each end of the rod 26 and are adapted to fit snugly within the cylinders. The piston rod is movable lengthwise of the cylinders and is of such length that when one piston is drawn into the tubular flange the other piston is a short distance from the die or nozzle end of the other cylinder. The piston rod 26 is threaded for substantially its entire length, as shown, and is moved lengthwise of the cylinders 11 and 12 by a driving collar 25 mounted between the plates 20 and 21 and having suitable threads to correspond to those of the rod. In order to prevent the rod 26 from rotating with the collar 25, the rod is provided with lengthwise slots 29 engaged by suitable feathers or keys 30 in the plates 20 and 21.

The driving collar 25 is provided with a gear 41 driven by a worm 40 mounted on a shaft 39 carrying a sprocket 38. The sprocket 38 is connected by a chain 37 to a sprocket 36 on a shaft 35 which is driven by a motor 31 through a pair of sprockets 33 and 32 and a chain 34. The pistons are then caused to travel slowly with the requisite amount of power to operate the machine.

Figure 4:
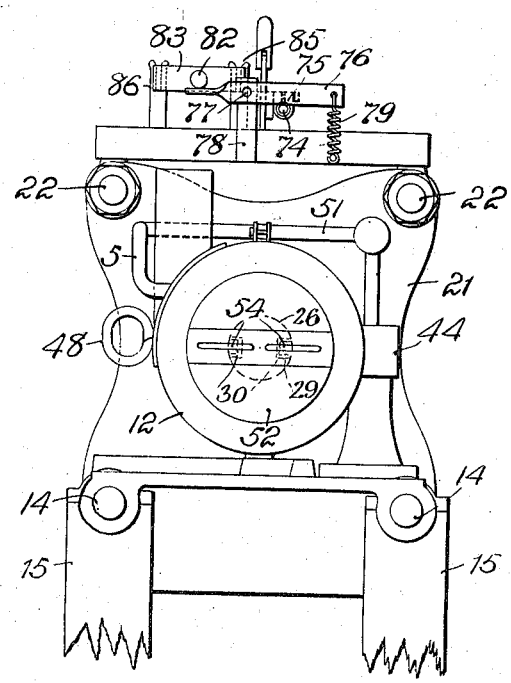
Fig. 4 is an end elevation of the machine taken from the right as seen in Figs. 2 and 3.

The cylinders 11 and 12 are each similar in construction and are each pivotally mounted at 44 to the frame of the machine to enable them to be swung into the position shown in dotted lines in Fig. 3 in order that a batch of candy may be introduced. In order to remove all strain from the pivots 44 the cylinders rest on ways 45 and 46 and are provided with suitable supporting projections 47 which are adapted to slide on the ways when the cylinders are swung about their pivots by a suitable hand member 48. At 49 are couplings by which the cylinders 11 and 12 may each be rigidly connected with the flanges 23 and 24. The couplings preferably each consist of a collar loosely mounted on the flanges 23 and 24 and having an inwardly extending flange 8 which engages with a flange 50. The collar is provided with internal threads and is adapted to be screwed on to the threaded flange 50 of the cylinder. This construction enables a tight solid joint to be readily made which has the necessary strength to withstand the heavy pressure exerted by the pistons. The end of each of the cylinders 11 and 12 is provided with a detachable nozzle or die 52 referred to above which is preferably threaded into the ends of the cylinder. The member 52 has a concave cone-shaped inner surface 53 and a pair of openings 54, as shown in Fig. 4, which form the plastic candy into ribbons or strips as it is expressed through the die by the piston. I do not limit myself to this particular form of die for other forms may be employed according to the shape and character of the piece of goods to be made.

The cylinders 42 are each provided with means for keeping the plastic candy at the proper temperature during the operation of the machine. For this purpose each cylinder is provided with a pair of water jackets 55 and 56 which completely surround the cylinder, as shown in Fig. 2, and are spaced apart at 57 to enable the pivot 44 to be firmly secured to the cylinder 42. A pipe 60 extends from a reservoir 61 and passes through the pivots 44 of each cylinder, and at its upper end is provided with a swivel joint 4 having a horizontal pipe 51 connected to it. A pair of pipes 5 and 6 connect the pipe 51 with the outer ends of the water jackets 56 and 55. Another connection from the jackets 55 and 56 to the reservoir 61 is afforded by Y-shaped pipes 7 and 9 and flexible connecting pipes 62. This construction enables the cylinders to be swung on the pivots 44 without interfering with the pipe connections. Means for heating the water in the tank to the desired temperature is provided, and preferably consists of a steam coil 63 which is connected to an upright steam inlet pipe 64 at the center of the frame of the machine by means of a ball and socket steam joint 65. A suitable motor driven pump 66 is secured to the frame of the machine and is arranged to force water from the tank 61 through each of the water jackets 55 and 56. In this manner the cylinders are maintained at the temperature required to keep the candy contained in them at the proper consistency to be formed in the shape desired.

Mechanism for automatically stopping the machine when a batch of candy has been completely expressed from a cylinder and for enabling the driving mechanism to be reversed by the operator is provided. This mechanism consists of a yoke 68 comprising a pair of levers 69 and 70 pivoted to a cross strap 71 and joined at their upper end by a hand member 72. Each of the levers 69 and 70 carries an arm 67 which fits loosely through holes in the plates 20 and 21 and projects at an angle into the chambers formed by the flanges 23 and 24 so as to be engaged by the pistons and moved inwardly. When one arm 67 is thus moved inwardly the yoke 68 is swung on its pivots and the other arm 67 is moved outwardly. A cross member 73 connects the said levers 69 and 70 rigidly together and carries at one side a slide rod or latch 74 which is threaded centrally of its length to a pair of split collars 75 pivotally connected to the member 73. A lever 76 is pivoted at 77 to an upright 78 and is provided with a spring 79 at one end. When the latch 74 is inserted beneath the lever it is held up against the spring 29 in the position shown in Fig. 2. The other end of the lever 76 is preferably flattened, as shown at 81, and engages with the handle 82 of a suitable switch 83 pivoted at 84 and adapted to make engagement with contacts 85 and 86. The switch 83 is also arranged to make engagement with another pair of contacts 87 and 88 when it is tilted in the opposite direction. At the other end of the latch 74 a lever 10 of similar construction to the lever 76 is arranged to engage with the handle 82 of the switch when the switch is in engagement with the contacts 87 and 88. The movement of member 67 and lever 69 caused by contact with the piston 27 swings the yoke 68 about its pivots 71 thereby causing the latch 74 to be moved to the left, as shown in Fig. 2, so that the end of the latch 74 is withdrawn from under the lever 76 and it is rocked about its pivot by the spring 79 thereby lifting the switch 83 out of engagement with the contacts 85 and 86. In the same way if the switch 83 is against the contacts 87, 88 and the lever 10 is held by the latch 74, the switch will be lifted when the piston 28 engages with the other arm 67. The contacts 85 and 86 are connected by suitable wires 89 and 90 to the motor 31 whereby it is caused to rotate in one direction, and the contacts 87 and 88 are connected by suitable wires 91 and 92 to the motor 31 in a manner to cause it to rotate in the reverse direction.

Mechanism for reversing the position of the cylinders 11 and 12 is provided to enable the operator to swing the cylinder, which has just been filled with a new batch of candy, into operative position adjacent a suitable conveyer 94 and cutter 95. This consists of an arc shaped rack 96 preferably secured to the floor or like support adjacent the track 19 on which the rollers 18 of the frame travel. A pinion 97 meshes with the rack and is mounted on a shaft 98 carrying a bevel gear 99. The bevel gear 99 meshes with a bevel gear 100 fast on a shaft 101 on which a clutch member 102, operated by a suitable hand lever 103, is mounted. A second clutch member 104 is loosely mounted on the shaft 101 and is driven by the motor 31 through a belt which passes around a pulley 105 on the shaft 35. When the clutch is thrown into engagement the pinion 97 acts on the rack and turns the machine about on the track 19 so that the position of the cylinder is reversed. The clutch is preferably of the friction type and arranged to permit a relative movement of the driving parts if the operator first throws out the clutch at the proper time. When the motor 31 is reversed by the switch 83 the rotation of the pinion 97 is reversed so that the machine may be swung back again to its original position. It will be understood that the motor 31, driving mechanism therefor and water tank are all mounted on the frame and together with the frame cylinders, etc., form a unit which is turned as a whole to present the cylinders alternately to the conveyer.

The operation of the machine is as follows: The cylinder from which a piston has been withdrawn, for example the cylinder 12, is disconnected from the fixed flange 23 by unscrewing the collar 49 and is swung outwardly at an angle about the pivot 44 as shown in Fig. 3. A batch of candy is then introduced and the cylinder is swung back into alinement with the flange and is securely connected to it by the collar. The yoke 68 is then swung to the right, as shown in the drawings, and the latch 74 inserted beneath the lever 76. The switch 83 is placed in engagement with the contacts 85 and 86 with the handle 82 against the flattened end of the lever 76. The motor 31 is thus set in motion and turns the collar 25 on the piston rod 29 and moves the piston rod slowly to the right. The piston 28 enters the cylinder 12 and at the same time the piston 27 is slowly withdrawn from the cylinder 11. As the piston 28 passes into the cylinder 12 the batch of candy, which is maintained at the proper consistency by the constant circulation of water through the water jackets 55 and 56 is first compressed and then is forced through the openings 54 in the die 52 and is delivered in the shape or form desired to the conveyer and cutter 94 and 95 respectively.

When the piston 28 has arrived at a point a short distance from the die 52 the piston 27 enters the fixed flange 24 of the plate 20 so that the collar 49 may be loosened and the cylinder 11 swung to an angle to enable it to be filled with a batch of candy. The cylinder is then swung back and secured to the flange 24. Just as the piston 28 arrives at the end of its stroke, the piston 27 engages with the projecting end of the arm 67 and moves it inwardly. The yoke 68 is thus swung slightly about its pivots 71 and the latch 74 is withdrawn from under the lever 76 which causes the lever to raise the latch 83 and the motor 31 to be stopped.

The switch 83 is then tilted to the other position in engagement with the contacts 87 and 88 and the motor is started in the reverse direction. The pistons 27 and 28 commence to travel in the opposite direction and while the new batch of candy is being compressed the operator throws in the clutch by the lever 103 and reverses the position of the cylinders 11 and 12 so that the cylinder 11 is adjacent the conveyer and cutter. When the machine gets to the proper position the clutch is released and the batch of candy in the cylinder 11 is expressed from the die in the desired form by the piston 27. In this manner the machine may be made to operate continuously on successive batches of candy without any intervening delay whatsoever.

What I claim is:

1. In a machine of the character described, the combination with a pair of oppositely disposed cylinders in an axial line with each other and each provided with a candy forming die, a pair of pistons one of which operates in one cylinder and the other in the other, a pivoted mounting for each cylinder to permit it to be swung to an angle with said axial line, and means for securing the said cylinders in operating position.

2. In a machine of the character described, the combination with a piston and driving mechanism therefor, of a cylinder having a pivot at one side, a flange in alinement with said cylinder into which said piston is adapted to be moved, and a collar threaded on to said flange and cylinder by which said flange and cylinder are secured together.

3. In a machine of the character described, the combination with a cylinder, of a piston adapted to operate therein, a motor for operating said piston, a switch controlling the motor, a spring operated lever engaging the switch, a latch engaging said lever, and means for operating said latch when the piston arrives at the end of its stroke to permit said spring operated lever to move the switch.

4. In combination, a conveyer, a pair of opposed cylinders operating alternately, and means for turning the pair of cylinders end for end to present the working cylinder to the conveyer.

5. In a machine of the character described, the combination with a pair of oppositely disposed cylinders each of which is provided with a candy forming die, a pair of pistons one of which is adapted to operate in each of the cylinders, and driving mechanism for the pistons, of a conveyer, and means for reversing the position of the cylinders whereby the die of each cylinder may be positioned adjacent the conveyer.

6. In a machine of the character described, the combination of a conveyer, a frame, a pair of oppositely disposed cylinders mounted on said frame in an axial line with each other and each provided with a candy forming die, a pair of pistons one of which operates in one cylinder and the other in the other, pivotal connections between the frame and each of said cylinders whereby said cylinder may be moved on said frame to a position at an angle to said axial line, and means for rotating said frame to present each of said cylinders to said conveyer.

7. In a machine of the character described, the combination of a pair of oppositely disposed cylinders arranged in an axial line with each other, a pair of tubular members between said cylinders and in line with them, a pair of pistons one in each cylinder, a common piston rod for each piston extending through said tubular members, said piston rod being threaded, an operating nut on said piston rod located between said tubular members, and means for securing said tubular members together.

8. In a machine of the character described, the combination of a pair of oppositely disposed cylinders arranged in an axial line with each other, a pair of tubular members between said cylinders and in line with them, a pair of pistons one in each cylinder, a common piston rod for each piston extending through said tubular members, said piston rod being threaded, an operating nut on said piston rod located between said tubular members, means for securing said tubular members together, and means for detachably securing each cylinder to its adjacent tubular member.

In testimony whereof I affix my signature.

WILLIAM B. LASKEY.